March 9, 1948.  L. F. KRAMER  2,437,393
WEED PULLER
Filed June 24, 1946
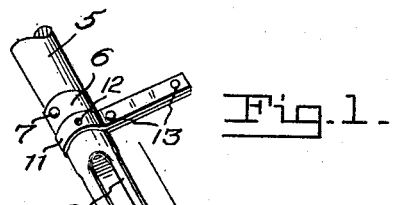
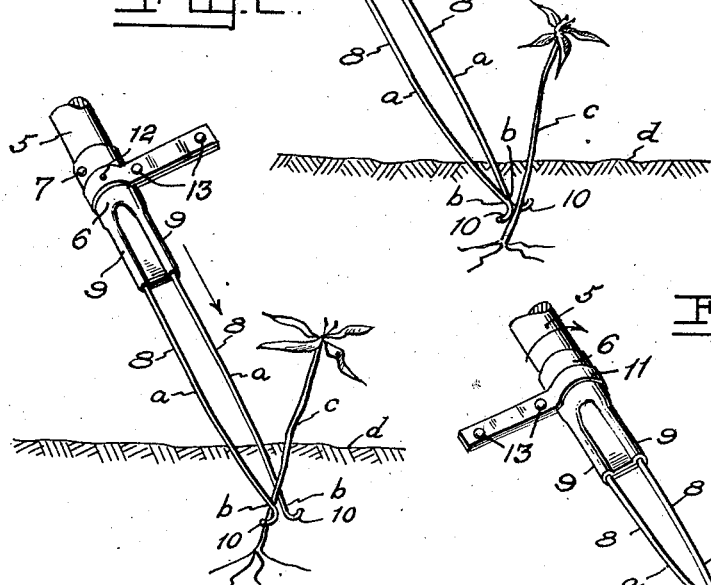
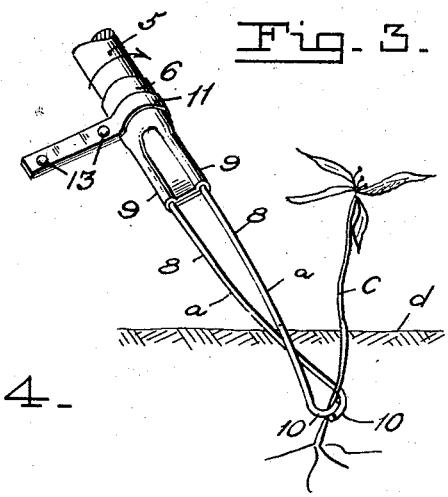
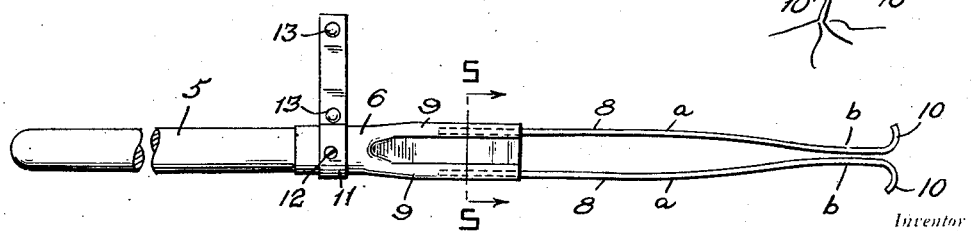
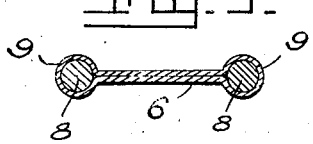
Inventor
Lester F. Kramer
By Randolph & Beavers
Attorneys Patented Mar. 9, 1948

2,437,393

UNITED STATES PATENT OFFICE 2,437,393

WEED PULLER

Lester F. Kramer, Enumclaw, Wash.

Application June 24, 1946, Serial No. 678,815

4 Claims. (Cl. 294—50.6)

This invention relates to weed pullers or implements for extracting weeds from the ground by their roots.

An important object of the present invention is to provide a weed puller capable of being inserted into the ground and actuated in such a manner as to hook against the stock of a weed adjacent its roots, whereby the weed can be pulled along with the major portion of its root system.

Another important object of the invention is to provide a root extracting implement which includes a pair of hook formed members, which can be easily pushed passed the stem of a weed below earth surface, and there rotated, so as to overlap the hooks, to the end that by pulling upwardly on the implement, the weed can be easily pulled from the ground with a substantial portion of its root system intact.

A further object of the invention is to provide a weed puller of such simple construction that it can be manufactured at low cost and perhaps more reasonably than a great many less efficient weed pullers now on the market.

These and various other objects and advantages of the invention will become apparent to the reader of the following description.

In the drawing:

Figure 1 is a fragmentary perspective view showing the hooked end of the implement about to be pushed pass the stem of a weed.

Figure 2 is a fragmentary perspective view showing the implement after the hook end has been pressed pass the weed stem and preparatory to rotating the implement.

Figure 3 is a perspective fragmentary view showing the implement after it has been rotated to inverted position, thus crossing the hook legs and bringing the hook ends to overlapping position.

Figure 4 is a top plan view of the implement.

Figure 5 is an enlarged cross sectional view taken on line 5—5 of Figure 4.

Referring to the drawing, the implement includes an elongated handle 5, approximately four feet long, and a ferrule 6, into which the handle 5 extends, these parts being suitably secured together, by a securing element 7.

Numerals 8, 8 denote a pair of elongated spring rods, a pair of adjacent ends of which are disposed into barrel formations 9, 9 of the ferrule 6. These barrel formations 9, 9 can be formed incident to a pressing operation which presses the forward end of the ferrule 6 into a flattened formation about the adjacent ends of the rods 8, 8, thus firmly anchoring these ends of the rods to prevent displacement. A die of obvious form is used for effecting this positive connection.

The elongated rods 8, 8 can be of any desired length and gauge and preferably converged toward each other from a point $a$ to a point $b$. The rods preferably touch each other at the points $b$ and from there forwardly, gradually flare outwardly and terminate in laterally disposed hooks 10, 10, disposed in opposite directions with respect to each other.

A depressor, for foot pressure may be employed and this consists of a piece of strap iron, disposed around the cylindrical portion of the ferrule 6, as at 11, where it is secured in place by a screw or the like 12. The end portions of this strap are brought together and riveted or otherwise secured as at 13 to provide a laterally disposed foot engaging arm whereby foot pressure can be exerted in driving the rods 8, 8 into the soil, as to the extent shown in Figures 1 to 3 inclusive. Obviously, the depressor can be swung to either side of the implement depending upon which foot the user normally employs.

As shown in Figure 1, reference character $c$ denotes a weed. The hook end of the implement is driven into the soil $d$ on a line with the stock of the weed and as the hooks 10, 10 press against the weed stock, they separate and straddle the weed, as in the manner shown in Figure 2. With the hooks 10, 10, now beyond the weed stock, all that is necessary is to rotate the implement, as in the direction of the arrow shown in Figure 3, thus twisting the rods 8, 8 and bringing the hooks 10, 10 to overlapping position with respect to each other, thus defining a loop embracing the weed stock. The person using the implement, need only pull outwardly and the weed will be extracted from the ground and in most instances along with its root system, or a major portion thereof.

The implement can be used in the same manner for pulling fruit laden branches closer to the fruit picker, for lifting dead animals by their legs, for pulling grape bunches closer to the picker and for numerous other purposes, not necessary to mention here.

Obviously, the flexible legs can be rotated in either direction in order to bring the hooks into overlapping relation. Further, the legs can be of one piece, bent to a U-shape, with the bight held by the compressed ferrule. The depressor can be used at various positions with respect to the legs, ferrule and handle and can be entirely dispensed with when a reasonably strong person employs the implement.

It has also been found practical to use this implement for such things as thinning out rows of plants.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. A weed pulling implement comprising an elongated member provided with a pair of closely spaced flexible legs at one end, each terminating at its free end in an outwardly disposed portion, said legs being adapted to be twisted by rotation of the elongated member to bring said lateral portions into overlapping positions to form a backing in pulling weeds.

2. A weed pulling implement comprising an elongated handle, a pair of flexible spring legs projecting from the handle at one end and having their outer portions converging, said converging portions being provided with outwardly extending portions adapted to overlap one another when the legs are twisted by rotation of the handle.

3. A weed pulling implement comprising an elongated handle, a pair of flexible spring legs projecting from the handle at one end and having their outer portions converging, said converging portions being provided with outwardly extending portions adapted to overlap one another when the legs are twisted by rotation of the handle, and a foot depressor carried by the handle.

4. A weed pulling implement comprising an elongated handle, a pair of flexible spring legs projecting from the handle at one end and having their outer portions converging, said converging portions being provided with outwardly extending portions adapted to overlap one another when the legs are twisted by rotation of the handle, said laterally disposed portions of the legs being of hook form.

LESTER F. KRAMER.

REFERENCES CITED

The following references are of record in the file of this patent:

UNITED STATES PATENTS

| Number | Name | Date |
| --- | --- | --- |
| 698,715 | Knight | Apr. 29, 1902 |
| 1,692,110 | Cave et al. | Nov. 20, 1928 |

FOREIGN PATENTS

| Number | Country | Date |
| --- | --- | --- |
| 15,529 | Great Britain | Sept. 16, 1909 |